United States Patent
Wang

(10) Patent No.: US 9,460,128 B1
(45) Date of Patent: Oct. 4, 2016

(54) SLIDING WINDOW VIEW GROUP CONSTRUCTS IN RELATIONAL DATABASE QUERY LANGUAGE

(71) Applicant: ARRIS Solutions, Inc., Suwanee, GA (US)

(72) Inventor: Tony Wang, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 538 days.

(21) Appl. No.: 13/905,684

(22) Filed: May 30, 2013

Related U.S. Application Data

(60) Provisional application No. 61/783,899, filed on Mar. 14, 2013.

(51) Int. Cl.
  *G06F 7/00* (2006.01)
  *G06F 17/30* (2006.01)

(52) U.S. Cl.
  CPC .............................. *G06F 17/30292* (2013.01)

(58) Field of Classification Search
  CPC ................. G06F 17/30383; G06F 17/30516; G06F 17/30592; G06F 3/0481; G06F 17/30292
  See application file for complete search history.

(56) References Cited

U.S. PATENT DOCUMENTS

| | | | | |
|---|---|---|---|---|
| 7,822,712 B1* | 10/2010 | Robinson | .......... | G06F 17/30383 707/624 |
| 2004/0122844 A1* | 6/2004 | Malloy | ............. | G06F 17/30592 |
| 2009/0182779 A1* | 7/2009 | Johnson | ............ | G06F 17/30516 |
| 2013/0007069 A1* | 1/2013 | Chaliparambil | ....... | G06Q 50/22 707/803 |
| 2014/0046975 A1* | 2/2014 | Wang | ................ | G06F 17/30516 707/771 |
| 2015/0089409 A1* | 3/2015 | Asseily | .................. | G06Q 10/10 715/765 |

* cited by examiner

*Primary Examiner* — Taelor Kim
(74) *Attorney, Agent, or Firm* — Bart A. Perkins

(57) ABSTRACT

This disclosure relates to populating an aggregated sliding window view group comprising one or more internal views, and each of the internal views in group has its own interval. In some implementations of this disclosure, the aggregated sliding window view group can store the history of previous view results and each row in a view inside the aggregated sliding window view group can correspond to a fixed interval of time. In various implementations, a view inside the aggregated sliding window view group can be populated from lower-level sliding window views based on a relationship between the aggregated sliding window view and the lower-level sliding window views. In some implementations, a sliding window view can store a constant number of view results. The aggregated sliding window view group can provide a user with a convenient and efficient means for displaying multiple data aggregates associated with multiple periods of time simultaneously.

20 Claims, 5 Drawing Sheets

400

| Start Time | Error Count |
|---|---|
| 2008-01-01 | 200 |
| 2008-01-02 | 195 |
| 2008-01-03 | 183 |
| 2008-01-04 | 201 |

410

| Start Time | Error Count |
|---|---|
| 2008-01-01 00:00 | 30 |
| 2008-01-01 01:00 | 25 |
| 2008-01-01 02:00 | 29 |
| ... | ... |

420

| Start Time | Error Count |
|---|---|
| 2008-01-01 02:01 | 2 |
| 2008-01-01 02:02 | 1 |
| 2008-01-01 02:03 | 0 |
| ... | ... |

FIG. 4 ically recorded in a single sliding window view).

SLIDING WINDOW VIEW GROUP CONSTRUCTS IN RELATIONAL DATABASE QUERY LANGUAGE

CROSS REFERENCE TO RELATED APPLICATION

This application is a non-provisional application claiming the benefit of U.S. Provisional Application Ser. No. 61/783,899, entitled "Optimizing Sliding Window View Constructs in Relational Database," which was filed on Mar. 14, 2013, and is incorporated herein by reference in its entirety. U.S. Provisional Application Ser. No. 61/774,061, entitled "An Extension to Materialized View Constructs in Relational Database Query Language," which was filed on Mar. 7, 2013, and U.S. Nonprovisional application Ser. No. 13/905,704, entitled "Sliding Window View Constructs in Relational Database Query Language," which was filed on May 30, 2013, are incorporated herein by reference in their entirety.

TECHNICAL FIELD

This disclosure relates to optimized view creation language that is operable to generate aggregated sliding window views based upon relationships among two or more individual sliding window views in a group.

BACKGROUND

Relational database query language (RDQL) can provide a user with a means for gathering and manipulating data that is stored in one or more databases. Generally, enterprise application developers are faced with the challenge of processing growing amounts of data efficiently and presenting the data in real-time in such a manner so as to meet complex operational and strategic requirements. In some cases, application developers rely on RDQL to organize large amounts of data into summary tables presented in a live dashboard (e.g., a table displayed and updated in real time). As an example, the live dashboard can contain aggregated data associated with some period of time.

Generally, materialized view constructs in RDQL can save pre-calculated query results in a temporary table, but the history of previous view results is lost. Moreover, in some circumstances, materialized views are unable to address naturally with aggregate functions. For example, existing materialized views are unable to allow aggregated data to be viewed in a sliding window where the aggregations are based on fixed time slices inside that window timeframe. As another example, existing materialized views are unable to allow data to be retained in a view only falling into a period. A need exists for an extension of the materialized view constructs in RDQL.

BRIEF DESCRIPTION OF THE DRAWINGS

FIG. 4 is an example illustration of multiple sliding window views in an aggregated sliding window view group, wherein the highest level sliding window view can be populated from the lower level sliding window views due to the existence of an aggregated view relationship between the multiple sliding window views.

Like reference numbers and designations in the various drawings indicate like elements.

DETAILED DESCRIPTION

In some implementations of this disclosure, systems and methods can operate to extend materialized view constructs in RDQL. Novel syntax can create a new type of materialized view, which can be referred to as a sliding window view. In some implementations of this disclosure, the sliding window view can store one or more previous view results and each row in the sliding window view can correspond to a fixed time slice. The sliding window view can provide a user with a convenient and efficient means for displaying data summary tables corresponding to a period of time. In some implementations, multiple sliding window views can exist in a group, and an optimization is needed to populate the multiple sliding window views simultaneously.

In some implementations of this disclosure, novel syntax in RDQL can create a sliding window view such that an existing sliding window view can be altered or dropped. Further, as an example, the novel syntax can save pre-calculated query results in a temporary table and save the history of previous view results in a temporary table such that the previous results can be based on a fixed time slice in a sliding window.

A need exists for an optimization of sliding window view constructs in RDQL. A single sliding window view can be limited in use, but a family of sliding window views can provide a smooth and efficient transition from lower-level views to higher-level views. For example, in a family of sliding window views comprising one or more high-level sliding window views that are multiples of one or more low-level sliding window views, the high-level sliding window views can be derived from the low-level sliding window views. In some implementations of this disclosure, statements incorporating structured query language (SQL) dialect can operate to create a family of sliding window views.

Figure 1:
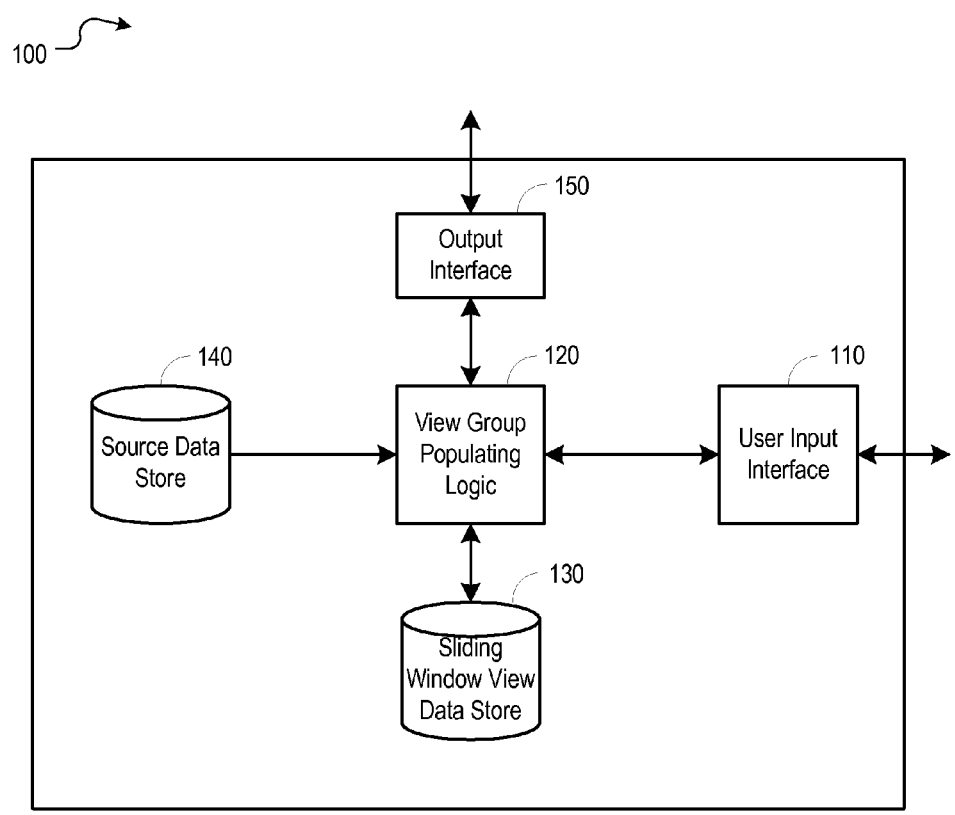
FIG. 1 is a block diagram illustrating an example system operable to facilitate generating an aggregated sliding window view group based upon a relationship between two or more individual sliding window views.

FIG. 1 is a block diagram illustrating an example system operable to facilitate generating an aggregated sliding window view group based upon a relationship between two or more individual sliding window views. In some implementations, a sliding window view group can be defined in a creation statement and can hold and/or display manipulated data from one or more sources. For example, a sliding window view group can comprise multiple sliding window views over a perpetual or predetermined period of time, and each sliding window view within the sliding window view group can comprise data associated with an interval of time (e.g., predetermined period of time corresponding to the data held in the sliding window view). In some implementations, a sliding window view group can include a constant and predetermined number of sliding window views. The system 100 can include a user input interface 110, view group populating logic 120, a sliding window view data store 130, a source data store 140, and an output interface 150.

In some implementations, the user input interface 110 can be used to provide an interface between a user and the system 100. For example, the system 100 can receive data and instructions for operating on the data through the user input interface 110. In various implementations, user input can be organized into one or more queues. For example, data associated with a specific interval (e.g., status or identification data associated with a minute, hour, day, week, month, etc.) can be held in a queue and, in some implementations, can be ordered based on chronologic, status or identification information/data associated with the specific interval.

The view group populating logic 120 can identify incoming data as source data and can aggregate source data to sliding window view data storage (e.g., sliding window view data store 130). For example, where view group populating logic 120 identifies incoming data as source data, view group populating logic can aggregate the data to be stored in a sliding window view data store 130. In various implementations, incoming data can be identified as source data where information/data associated with the incoming data matches predetermined criteria. For example, incoming data can be identified as source data where the data is associated with a predetermined interval type (e.g., minute, hour, day, month, etc.).

The view group populating logic 120 can also be operable to generate sliding window views (e.g., views that contain results of past and present queries). For example, view group populating logic 120 can execute operations on data (e.g., incoming data, source data, etc.) in response to a user query. In various implementations, view group populating logic 120 can direct past and present query results into sliding window views and can further direct sliding window views into storage (e.g., sliding window view data store 130). For example, a sliding window view data store 130 can be operable to store one or more sliding window views comprising user query results.

The view group populating logic 120 can also be operable to populate a sliding window view from one or more existing sliding window views. For example, based on a requested query, view group populating logic 120 can identify incoming source data and/or one or more sliding window views stored in the sliding window view data store 130 to use in the population of a sliding window view. In various implementations, view group populating logic 120 can be operable to identify the interval associated with a sliding window view (e.g., the specific minute, hour, day, month, etc. associated with the sliding window view) and to calculate the start time for the sliding window view based upon the identified interval.

The view group populating logic 120 can also be operable to purge rows from a sliding window view in an aggregated sliding window view group. In various implementations, view group populating logic 120 can remove a number of rows from a sliding window view based upon an identification of the number of retention rows associated with the sliding window view. For example, view group populating logic 120 can calculate the difference between the number of rows in the sliding window view and the number of retention rows associated with the sliding window view, and can remove a number of rows equal to this difference from the sliding window view.

In some implementations, an aggregated view relationship can exist between a sliding window view and one or more lower-level views. In various implementations, an aggregated view relationship can exist where data held in a lower-level view can be used to populate a higher-level view within the sliding window view group. For example, a sliding window view associated with a one hour period of time beginning at 10:00:00 can have an aggregated view relationship with a lower-level view associated with a one minute period of time between 10:00:00 and 10:59:00.

The view group populating logic 120 can also be operable to populate a sliding window view from one or more lower-level views sharing an aggregated view relationship with the sliding window view. For example, view group populating logic 120 can determine whether a sliding window view has an aggregated view relationship with one or more lower-level views (e.g., views can be stored in the sliding window view data store 130, the source data store 140, or elsewhere). Where the sliding window view does have an aggregated view relationship with one or more lower-level views, view group populating logic 120 can populate the sliding window view from the one or more lower-level views. For example, view group populating logic can use and/or aggregate existing query results to populate the sliding window view. Where the sliding window view does not have an aggregated view relationship with one or more lower-level views, view group populating logic 120 can populate the sliding window view from one or more data sources. For example, view group populating logic can use source data stored in the source data store 140 to populate the sliding window view.

In some implementations, two or more sliding window views can be related such that the two or more views form a view family. Two or more sliding window views can form a view family where each of the two or more sliding window views share at least one defining subquery, or common data category (e.g., operation status measured over some period of time), with the other sliding window views. In various implementations, two or more sliding window views within a view family can form a hierarchy based on the relationship between the two or more sliding window views (e.g., if the interval of a first sliding window view in the family is a multiple of the interval of a second sliding window view in the family, then the first sliding window view can be considered higher in the hierarchy than the second sliding window view). It should be understood that sliding window views with logical timeframes can also form a hierarchy (e.g., a year is a multiple of a month, thus a first view having an interval of a year would be higher in a hierarchy than a second view having an interval of a month).

The sliding window view data store 130 can be operable to store one or more rows associated with one or more sliding window views. For example, the sliding window view data store 130 can store data associated with one or more sliding window views and/or the one or more rows within the sliding window views. In various implementations, rows can be organized into their associated sliding window views. In other implementations, data associated with a sliding window view can be held in storage external to the system 100.

The output interface 150 can be operable to provide an interface between the system 100 and a user or output device (not shown). For example, the output interface 150 can be used to transmit data associated with one or more sliding window views to a display device.

In some implementations, an aggregated view group can be created when multiple sliding window views are in the same view family and each of the multiple sliding window views shares one or more aggregated view relationships with other sliding window views in the family. For example, an aggregated view group can be created using the following:

TABLE 1

CREATE AGGREGATED SLIDINGWINDOW VIEW

[schema.]name
INTERVAL timeframe
[RETENTION rows
PURGETIMER period]
[,[schema.]name
INTERVAL timeframe
[RETENTION rows
PURGETIMER period]]...
POPULATETIMER period
AS
subquery Referring to the example in TABLE 1, the statement "CREATE AGGREGATED SLIDINGWINDOW VIEW" can indicate that an aggregated sliding window view group is created and that the contents of each of its sliding window views are persistent until purged. In some implementations, each sliding window view in the aggregated sliding window view group can comprise a table to store data associated with the view.

Referring to the example in TABLE 1, the statement "INTERVAL timeframe" can define a period of time over which one or more operations (e.g., one or more defining subqueries) can be executed for a sliding window view in an aggregated sliding window view group, hereinafter referred to as a "view interval." In various implementations, the statement "INTERVAL timeframe" can appear multiple times, and each statement can refer to a distinct sliding window view. In some implementations, the view interval can be either a fixed timeframe (e.g., a fixed number of seconds, minutes, hours, etc.) or a logical timeframe (e.g., one or more months). In some implementations, a logical timeframe can be a member of a set of timeframe literals as follows: {"millisecond", "second", "minute", "hour", "day", "week", "month", "quarter", "year", "decade", "century", "millennium"}. It should be understood that views with logical timeframes, like fixed timeframes, can also form a hierarchy (e.g., a year is a multiple of a month, thus a first view having an interval of a year would be higher in a hierarchy than a second view having an interval of a month). In various implementations, a single aggregated sliding window view group can have multiple intervals such that the one or more timeframes associated with views inside the aggregated sliding window view group will be of different lengths.

Referring to the example in TABLE 1, the statement "RETENTION rows" can define a number of rows to be held or stored in a view inside the aggregated sliding window view group at any given moment in time. In various implementations, the statement "RETENTION rows" can appear multiple times, and each statement can refer to a distinct sliding window view. In some implementations, where a number of rows in a view to be held or stored is not defined, each row in the sliding window view can be held or stored in perpetuity or until the view is dropped.

Referring to the example in TABLE 1, the statement "PURGETIMER period" can define a frequency in which views are purged from an aggregated sliding window view group. In some implementations, a timer can count down from a predetermined period of time (e.g., the value of "period"), and when the timer expires, a process of purging one or more views from the aggregated sliding window view group can begin. In various implementations, after the timer expires, the timer can reset to the same or a different predetermined period of time.

Referring to the example in TABLE 1, the shared statement "POPULATETIMER period" can define a frequency in which one or more views within an aggregated sliding window view group is populated. In some implementations, a timer can count down from a predetermined period of time (e.g., the value of "period"), and when the timer expires, a process of populating views within the aggregated sliding window view group can begin. In various implementations, after the timer expires, the timer can reset to the same or a different predetermined period of time. In some implementations, a single view populating timer can exist in an aggregated sliding window view group creation statement.

In some implementations, a previously created aggregated view group can be altered. For example, a previously created aggregated view group can be altered using the following syntax:

TABLE 2

ALTER AGGREGATED SLIDINGWINDOW VIEW

[schema.]name
{RETENTION rows | PURGETIMER period}
[,[schema.]name
{RETENTION rows | PURGETIMER period}]]...
[POPULATETIMER period]

Referring to the example in TABLE 2, the statement "ALTER AGGREGATED SLIDINGWINDOW VIEW" can indicate that a previously created aggregated sliding window view group is to be altered. The statement can further identify the previously created aggregated sliding window view group that is to be altered. In various implementations, a number of retention rows and/or a period of time associated with a purging timer can be altered for a previously created sliding window view inside an aggregated sliding window view group. In some implementations, a shared populating timer period associated with one or more views in a view group can be altered.

Referring to the example in TABLE 2, the statement "RETENTION rows" indicates that the number of rows kept in a view inside the identified aggregated sliding window view group is altered. The statement "PURGETIMER period" indicates that the view purging timer for a view inside the aggregated sliding window view group is altered. The statement "POPULATETIMER period" indicates that the shared view populating timer period associated with a view group is altered.

In some implementations, a previously created view inside an aggregated sliding window view group can be dropped. For example, a previously created view inside an aggregated sliding window view group can be dropped using the following syntax:

TABLE 3

DROP AGGREGATED SLIDINGWINDOW VIEW

[schema.]name
[,[schema.]name]...

Referring to the example in TABLE 3, the statement "DROP AGGREGATED SLIDINGWINDOW VIEW" indicates that one or more views in a previously created aggregated sliding window view group are to be dropped and that the contents of the one or more dropped views will no longer exist in the database. In some implementations, the previously created aggregated sliding window view group can still exist if less than all of the views in the sliding window view group are dropped.

Figure 2:
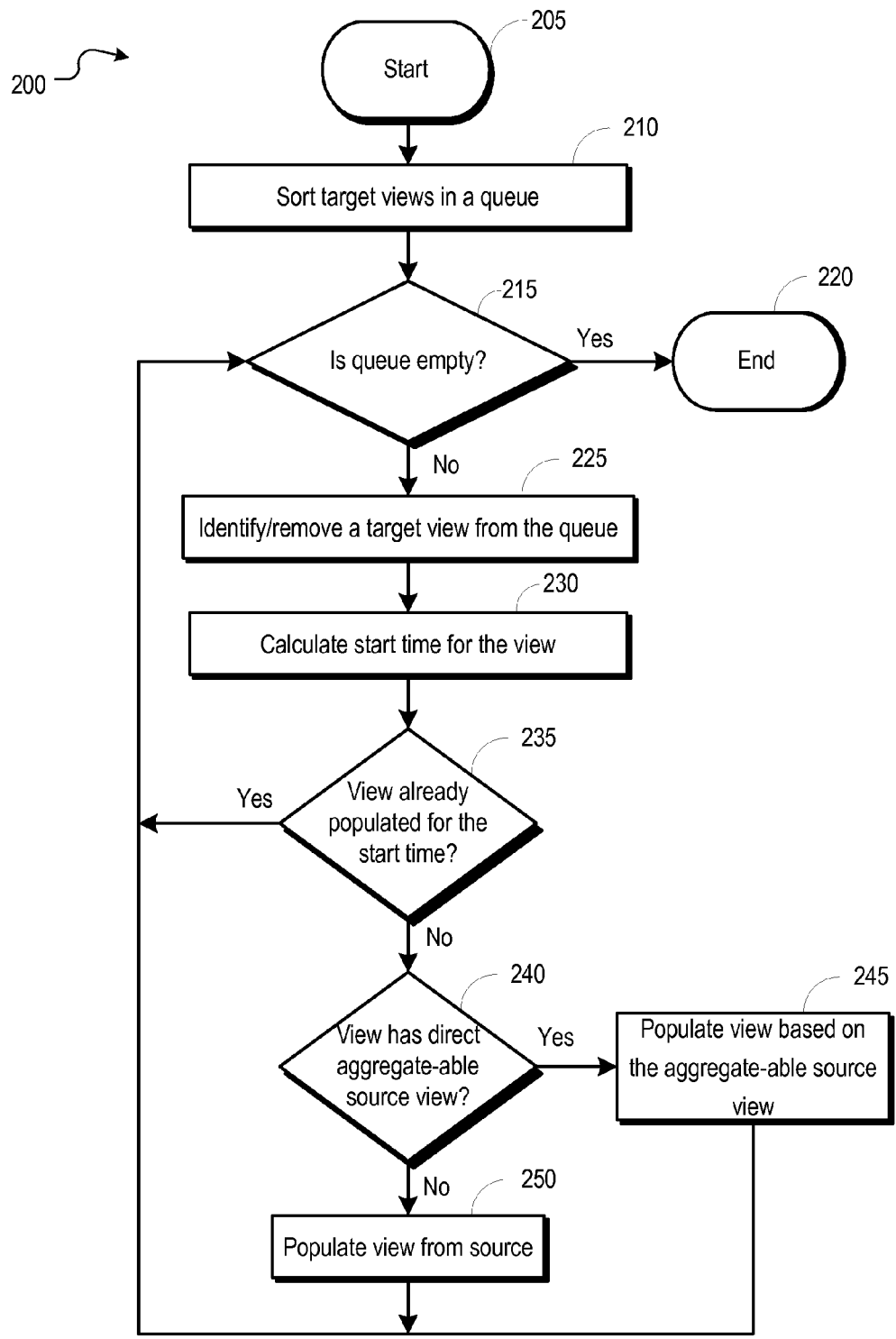
FIG. 2 is a flowchart illustrating an example process operable to generate an aggregated sliding window view group based upon a relationship between two or more individual sliding window views.

FIG. 2 is a flowchart illustrating an example process operable to generate an aggregated sliding window view group based upon a relationship between two or more individual sliding window views. The process 200 can start at stage 205 when a shared recurring populating timer expires. For example, a shared recurring populating timer can be predetermined and set for a particular view group. In various implementations, expiration of a shared recurring populating timer can trigger population of one or more target views in a queue. In some implementations, the shared recurring populating timer can reset and start over after it expires.

After the shared recurring populating timer expires, the process 200 can proceed to stage 210. At stage 210, target views can be sorted and stored in a queue. Target views can be sorted and stored in a queue, for example, by logic within a database system (e.g., view group populating logic 120 of FIG. 1). In some implementations, the target views can be sorted from smallest interval to largest interval. For example, a target view with an interval of a minute can be placed earlier in the queue than a target view with an interval of an hour, and a target view with an interval of an hour can be placed earlier in the queue than a target view with an interval of a day, etc.

After target views are sorted and stored in a queue, the process 200 can proceed to stage 215. At stage 215, a determination can be made whether the queue is empty. A determination whether the queue is empty can be made, for example, by logic within a database system (e.g., view group populating logic 120 of FIG. 1). If a determination is made that the queue is empty, the process 200 can end at stage 220.

If a determination is made that the queue is not empty, the process 200 can proceed to stage 225. At stage 225, a target view can be identified and/or removed from the head of the queue. A target view can be identified and/or removed from the queue, for example, by logic within a database system (e.g., view group populating logic 120 of FIG. 1). In some implementations, the target view that is positioned first in the queue can be identified and removed from the queue.

After a target view is identified and/or removed from the queue, the process 200 can proceed to stage 230. At stage 230, a start time associated with the identified target view can be calculated. A start time associated with the identified target view can be calculated, for example, by logic within a database system (e.g., view group populating logic 120 of FIG. 1). In some implementations, the start time can be calculated based upon the interval associated with the target view and a current timestamp. For example, view group populating logic 120 can identify the interval associated with the identified target view and the corresponding start time associated with the target view can be the interval preceding the current time (e.g., where the interval is a minute and the current timestamp is 10:01:29 (hour:minute:second), the start time can be 10:01:00). In various implementations, a target view can include a row for each start time within a predetermined period of time.

After the start time associated with the target view is calculated, the process 200 can proceed to stage 235. At stage 235, a determination can be made whether the target view is already populated for the calculated start time (e.g., the start time calculated at stage 230). A determination whether the target view is already populated for the calculated start time can be made, for example, by logic within a database system (e.g., view group populating logic 120 of FIG. 1). For example, view group populating logic 120 can check the target view for a row associated with the calculated start time. If a determination is made that the target view is already populated for the calculated start time, the process 200 can return to stage 215.

If a determination is made that the target view is not populated for the calculated start time, the process 200 can proceed to stage 240. At stage 240, a determination can be made whether the target view has one or more direct aggregate-able source views. In some implementations, one or more direct aggregate-able source views can be one or more existing sliding window views, wherein the target view is higher than the one or more existing sliding window views in a view family. For example, where the target view has an interval of an hour with a start time of 10:00:00, each source view with an interval of a minute and start times between 10:00:00 and 10:59:00 can be direct aggregate-able source views associated with the target view. A determination whether the target view has a direct aggregate-able source view can be made, for example, by logic within a database system (e.g., view group populating logic 120 of FIG. 1). In some implementations, view group populating logic 120 can check existing sliding window views (e.g., aggregated views such as minute, hour, day, month, etc.) for direct aggregate-able source views associated with the target view. For example, aggregated views can be stored (e.g., stored in the sliding window view data store 130) and view group populating logic 120 can check the stored aggregated views for direct aggregate-able source views associated with the target view.

If at stage 240, a determination is made that the target view has one or more direct aggregate-able source views, the process 200 can proceed to stage 245. At stage 245, the target view can be populated based upon the one or more aggregate-able source views. The target view can be populated, for example, by logic within a database system (e.g., view group populating logic 120 of FIG. 1). In some implementations, view group populating logic 120 can retrieve and/or manipulate previously aggregated views (e.g., sliding window views can be stored in and retrieved from a sliding window view data store 130 of FIG. 1). For example, where a target view has an interval of an hour with a start time of 10:00:00, view group populating logic 120 can populate the target view by retrieving and aggregating each view stored in the sliding window view data store 130 with an interval of a minute and start times between 10:00:00 and 10:59:00. In this example, the target view can be populated from previously generated views more efficiently than it could be populated from source data because the view group populating logic can take advantage of the previously calculated minute views. In some implementations, rows resulting from the creation of a sliding window view can be stored in a sliding window view data store 130. After the target view is populated based upon the one or more aggregate-able source views, the process 200 can return to stage 215.

Returning to stage 240, if a determination is made that the target view does not have a direct aggregate-able source view, the process 200 can proceed to stage 250. At stage 250, the target view can be populated from one or more data sources. The target view can be populated, for example, by logic within a database system (e.g., view group populating logic 120 of FIG. 1). For example, view group populating logic 120 can retrieve and/or manipulate data from one or more data sources (e.g., data stored in the source data store 140 of FIG. 1) and can generate one or more rows in the target view from the retrieved/manipulated data. In some implementations, rows resulting from the creation of a sliding window view can be stored in a sliding window view data store 130. After the target view is populated from source data, the process 200 can return to stage 215.

Figure 3:
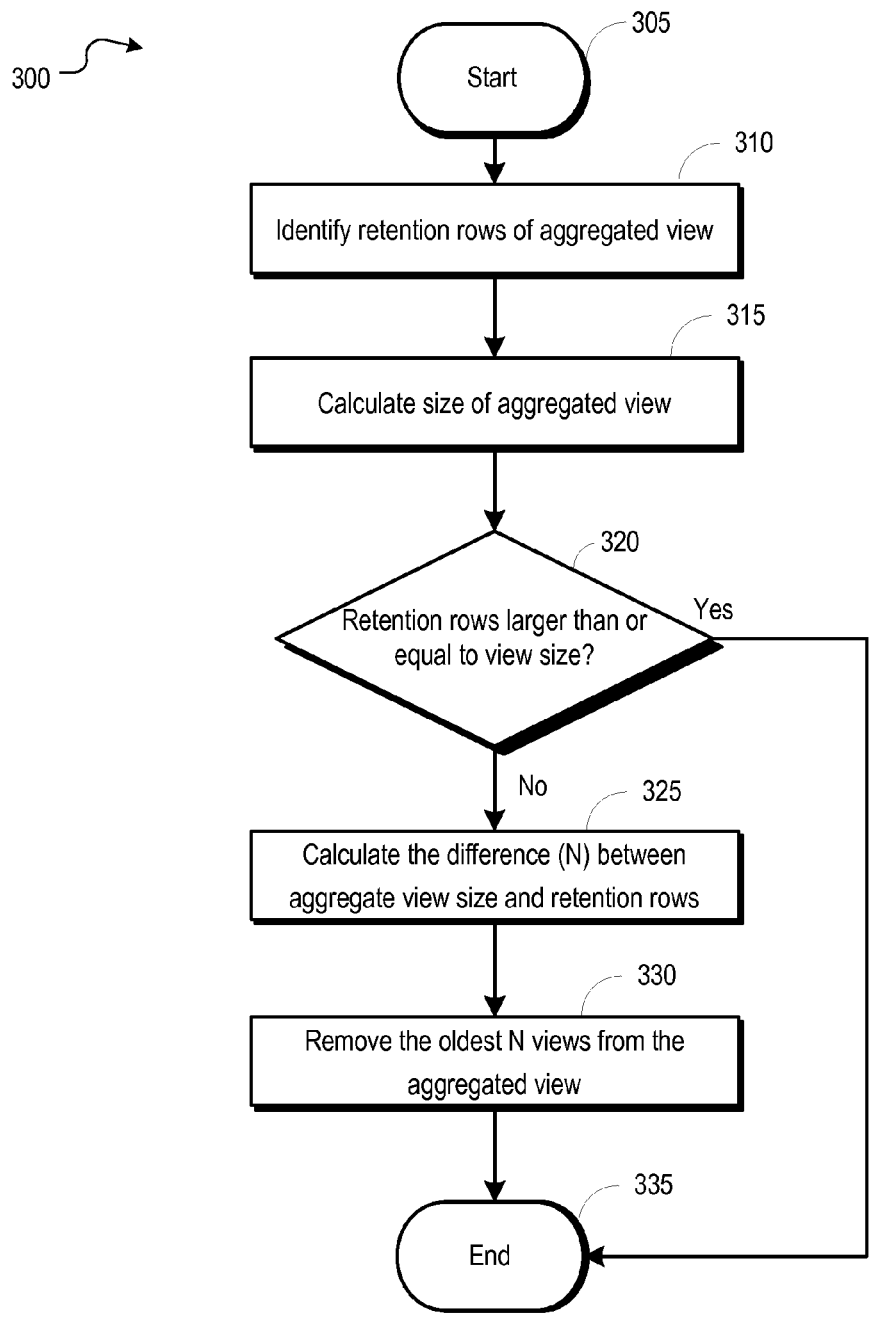
FIG. 3 is a flowchart illustrating an example process operable to purge one or more views from an aggregated sliding window view group based upon the difference between the number of rows in a sliding window view inside the aggregated sliding window view group and a predetermined number of retention rows for that sliding window view.

FIG. 3 is a flowchart illustrating an example process 300 operable to purge one or more views from an aggregated sliding window view group based upon the difference between the number of rows in a sliding window view inside the aggregated sliding window view group and a predetermined number of retention rows for the sliding window view. The process 300 can start at stage 305 when a recurring purging timer associated with the aggregated sliding window view expires. For example, a recurring purging timer can be predetermined and set for a particular sliding window view inside the aggregated sliding window view group. In various implementations, expiration of a recurring purging timer can trigger a view purging process. In some implementations, the recurring purging timer can reset and start over after it expires.

After the recurring purging timer expires, the process 300 can proceed to stage 310. At stage 310, the number of retention rows (e.g., a defined number of rows an aggregated sliding window view may hold) associated with the aggregated sliding window view can be identified. The number of retention rows associated with the aggregated sliding window view can be identified, for example, by logic within a database system (e.g., view group populating logic 120 of FIG. 1). In some implementations, a number of retention rows associated with the aggregated sliding window view group can be identified from a user's sliding window view group creation query associated with the sliding window view. For example, the number of retention rows associated with the aggregated sliding window view can be predetermined and set for a particular sliding window view inside the aggregated sliding window view group.

After the number of retention rows associated with the aggregated sliding window view is identified, the process 300 can proceed to stage 315. At stage 315, the size of the aggregated sliding window view can be calculated. The size of the aggregated sliding window view can be calculated, for example, by logic within a database system (e.g., view group populating logic 120 of FIG. 1). For example, the size of the aggregated sliding window view can be based upon a calculation of the number of rows in the sliding window view.

After the size of the aggregated sliding window view is calculated, the process 300 can proceed to stage 320. At stage 320, a determination can be made whether the number of retention rows associated with the aggregated sliding window view is larger than the calculated size of the sliding window view. The determination can be made, for example, by logic within a database system (e.g., view group populating logic 120 of FIG. 1). In some implementations, the determination can be based on a comparison between the number of retention rows identified at stage 310 and the number of rows in the aggregated sliding window view as calculated at stage 315. If a determination is made that the retention rows associated with the aggregated sliding window view are not larger in number than the calculated size of the sliding window view, the process 300 can proceed to stage 325.

At stage 325, the difference between the number of retention rows and the number of rows in the aggregated sliding window view can be calculated. The difference between the number of retention rows and the number of rows in the sliding window view can be calculated, for example, by logic within a database system (e.g., view group populating logic 120 of FIG. 1). In some implementations, the difference between the number of retention rows and the number of rows in the aggregated sliding window view can be calculated by subtracting the number of retention rows (e.g., the number identified at stage 310) from the number of rows in the sliding window view (e.g., the number calculated at stage 315).

After the difference between the number of retention rows and the number of rows in the aggregated sliding window view is calculated, the process 300 can proceed to stage 330. At stage 330, the oldest rows in the aggregated sliding window view can be removed from the sliding window view until the number of rows in the sliding window view is equal to or less than the number of retention rows associated with the sliding window view. The oldest rows in the aggregated sliding window view can be removed, for example, by logic within a database system (e.g., view group populating logic 120 of FIG. 1). For example, the number of rows removed from the aggregated sliding window view can be equal to the difference between the number of retention rows and the number of rows in the sliding window view (e.g., the number calculated at stage 325). After the oldest rows in the aggregated sliding window view are removed, the process 300 can end at stage 335.

Returning to stage 320, if a determination is made that the retention rows associated with the aggregated sliding window view are not larger in number than the calculated size of the sliding window view, the process 300 can end at stage 335.

In some implementations, the process 300 can start over from stage 305 when the recurring purging timer associated with the aggregated sliding window view next expires.

FIG. 4 is an example illustration of multiple sliding window views, wherein the highest level sliding window view can be populated from the lower level sliding window views due to the existence of an aggregated view relationship between the multiple sliding window views. A sliding window view can store and display results of a query for operational status tests of a network. For example, the daily sliding window view 400 displays results (e.g., "Error Count") of an operation in intervals of one day (e.g., each row of the daily sliding window view represents one day). In some implementations, results displayed in a sliding window view (e.g., "Error Count") can include a count of the number of operational status checks of a system (e.g., whether the operation status is successful, whether a warning exists, whether an error occurred, etc.). The hourly sliding window view 410 displays results of an operation in intervals of one hour. The minute sliding window view 420 displays results of an operation in intervals of one minute.

The daily sliding window view 400 can be an aggregated sliding window view that is populated from the results held in the hourly sliding window view 410. The daily sliding window view 400 can be populated more efficiently by using the results from the hourly sliding window view 410 rather than the more complex minute sliding window view 420.

Because data held in the hourly sliding window view 410 (e.g., "Error Count" in intervals of one hour) can be aggregated to populate views in the daily sliding window view 400, an aggregated view relationship exists between the hourly sliding view 410 and the daily sliding window view 400. For example, the Jan. 1, 2008 row in the daily sliding window view 400 can be populated by aggregating the "Error Count" measurements held in the hourly sliding window view 410 and which are associated with the Jan. 1, 2008 rows (e.g., each of the twenty-four (24) rows (00:00-23:00) associated with the date Jan. 1, 2008).

Because each of the sliding window views 400, 410, and 420 share a common data category (e.g., "Error Count" measured over some period of time with base units of seconds), the sliding window views can form a family hierarchy. For example, the minute sliding window view 420 (the view with the smallest intervals) is lower in the family hierarchy than the hourly sliding window view 410, and the hourly sliding window view 410 is lower in the family hierarchy than the daily sliding window view 400 (the view with the largest intervals).

Figure 5:
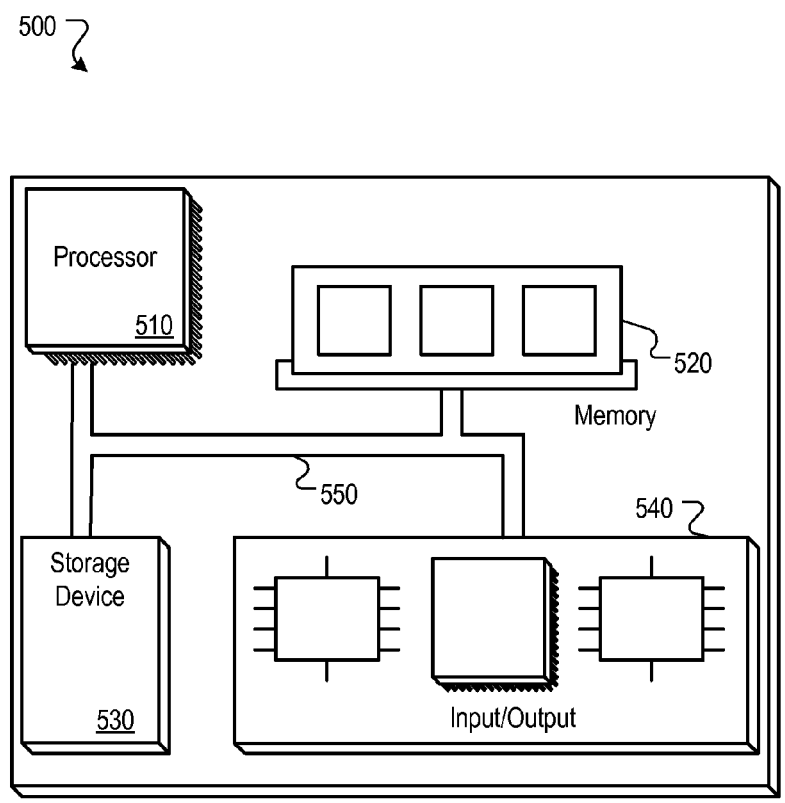
FIG. 5 is a block diagram illustrating an example hardware configuration operable to facilitate generating an aggregated sliding window view group based upon a relationship between two or more individual sliding window views.

FIG. 5 is a block diagram illustrating an example hardware configuration 500 operable to facilitate generating an aggregated sliding window view group based upon a relationship between two or more individual sliding window views. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500. In some implementations, the storage device 530 can store data in one or more data stores (e.g., sliding window view data store 130 and/or source data store 140).

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to receive input data and send output data to other input/output devices, such as one or more display devices (e.g., television screen, computer monitor, etc.). In other implementations, the input/output device can include driver devices configured to receive input data from one or more user input devices (e.g., keyboard, pointer device, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
  receiving information associated with one or more characteristics of an aggregated sliding window view group;
  generating one or more tables associated with the aggregated sliding window view group, wherein the aggregated sliding window view group comprises one or more interval views, each respective one interval view being associated with a pre-defined time interval, and wherein each respective one interval view comprises a plurality of rows, each row of the plurality of rows being associated with a duration, wherein the duration of each row is equivalent to a certain portion of the time interval of the associated interval view, and wherein the duration of each row of each respective interval view is equivalent to the duration of the other rows of the respective interval view;
  determining whether an interval view targeted for population has an aggregated view relationship with one or more previously stored interval views that are associated with a pre-defined time interval smaller than the pre-defined time interval with which the interval view targeted for population is associated;
  populating the interval view with the one or more previously stored interval views in response to determining that the interval view has an aggregated view relationship with at least one of the previously stored interval views; and
  storing the populated interval view for analysis, wherein the newly populated interval view is added to the current group of interval views making up the sliding window view group without an oldest interval view being removed from the group of interval views making up the sliding window view group until a maximum number of interval views is reached.

2. The computer-implemented method of claim 1, further comprising:
  identifying an interval associated with one of the one or more interval views when a population timer expires; and
  resetting and restarting the population timer when the population timer expires.

3. The computer-implemented method of claim 2, wherein the interval associated with the interval view comprises a fixed timeframe or a logical timeframe.

4. The computer-implemented method of claim 1, wherein each of the one or more interval views comprises data associated with an operation running for a period of time beginning at a start time.

5. The computer-implemented method of claim 4, wherein the start time is determined based upon an interval associated with the interval view and a current time or count.

6. The computer-implemented method of claim 1, wherein determining whether one or more of the interval views has an aggregated view relationship with one or more previously stored interval views comprises:

determining whether intervals associated with one or more of the interval views are multiples of an interval associated with one or more previously stored interval views.

7. The computer-implemented method of claim 1, further comprising:
identifying a number of rows in one of the one or more interval views to keep populated;
calculating the number of populated rows in the interval view;
determining whether the number of populated rows in the interval view is greater than the number of rows in the interval view to keep populated; and
removing a number of rows from the interval view if the number of populated rows in the interval view is greater than the number of rows in the interval view to keep populated, wherein the number of rows to remove from the interval view is equal to the difference between the number of populated rows and the number of rows in the interval view to keep populated.

8. The computer-implemented method of claim 7, wherein the number of rows removed from the interval view are removed from the interval view in an order from the oldest row in the interval view to the newest row in the interval view.

9. The computer-implemented method of claim 7, wherein rows are removed from an interval view inside the aggregated sliding window view group according to a pre-determined schedule or frequency.

10. A system, comprising:
one or more interfaces operable to be used to receive a user query and data associated with the user query and to transmit data associated with one or more interval views;
a data store operable to store computer program instructions; and
a processor operable to execute said computer program instructions, the computer instructions being operable to cause the processor to:
create one or more tables associated with an aggregated sliding window view group, wherein the aggregated sliding window view group comprises one or more interval views, each respective one interval view being associated with a pre-defined time interval, and wherein each respective one interval view comprises a plurality of rows, each row of the plurality of rows being associated with a duration, wherein the duration of each row is equivalent to a certain portion of the time interval of the associated interval view, and wherein the duration of each row of each respective interval view is equivalent to the duration of the other rows of the respective interval view;
identify an interval associated with one of the one or more interval views when a population timer expires;
reset and restart the population timer when the population timer expires;
determine whether an interval view targeted for population has an aggregated view relationship with one or more previously stored interval views that are associated with a pre-defined time interval smaller than the pre-defined time interval with which the interval view targeted for population is associated and that are in the aggregated sliding window view group; and
populate the interval view with the one or more previously stored interval views if the interval view has an aggregated view relationship with the one or more previously stored interval views in the aggregated sliding window view group, wherein newly populated interval views are added to the current group of interval views making up the sliding window view group without an oldest interval view being removed from the group of interval views making up the sliding window view group until a maximum number of interval views is reached.

11. The system of claim 10, wherein each of the one or more interval views comprises data associated with an operation running for a period of time beginning at a start time.

12. The system of claim 11, wherein the start time is determined based upon an interval associated with an interval view and a current time or count.

13. The system of claim 10, wherein determining whether one or more of the interval views has an aggregated view relationship with one or more previously stored interval views in an aggregated sliding window view group comprises:
determining whether intervals associated with one or more of the interval views are multiples of an interval associated with one or more previously stored interval views in the aggregated sliding window view group.

14. The system of claim 10, wherein said computer program instructions are further operable to cause the processor to:
identify a number of rows in one of the one or more interval views inside the aggregated sliding window view group to keep populated;
calculate the number of populated rows in the interval view;
determine whether the number of populated rows in the interval view is greater than the number of rows in the interval view to keep populated; and
remove a number of rows from the interval view if the number of populated rows in the interval view is greater than the number of rows in the interval view to keep populated, wherein the number of rows to remove from the interval view is equal to the difference between the number of populated rows and the number of rows in the interval view to keep populated.

15. The system of claim 14, wherein the number of rows removed from the interval view is removed from the interval view in an order from the oldest row in the interval view to the newest row in the interval view.

16. The system of claim 14, wherein rows are removed from the interval view according to a predetermined schedule or frequency.

17. One or more non-transitory computer readable media operable to execute on one or more processors, the computer readable being operable to cause the one or more processors to perform the operations comprising:
receiving information associated with one or more characteristics of an aggregated sliding window view group;
generating one or more tables associated with the aggregated sliding window view group, wherein the aggregated sliding window view group comprises one or more interval views, each respective one interval view being associated with a pre-defined time interval, and wherein each respective one interval view comprises a plurality of rows, each row of the plurality of rows being associated with a duration, wherein the duration of each row is equivalent to a certain portion of the time interval of the associated interval view, and wherein the duration of each row of each respective interval view is equivalent to the duration of the other rows of the respective interval view;

determining whether an interval view targeted for population has an aggregated view relationship with one or more previously stored interval views that are associated with a pre-defined time interval smaller than the pre-defined time interval with which the interval view targeted for population is associated;

populating the interval view with the one or more previously stored interval views in response to determining that the interval view has an aggregated view relationship with at least one of the previously stored interval views; and storing the populated interval view for analysis, wherein the newly populated interval view is added to the current group of interval views making up the sliding window view group without an oldest interval view being removed from the group of interval views making up the sliding window view group until a maximum number of interval views is reached.

18. The one or more non-transitory computer-readable media of claim 17, wherein determining whether one or more of the interval views has an aggregated view relationship with one or more previously stored interval views in the aggregated sliding window view group comprises:

determining whether intervals associated with one or more of the interval views are multiples of an interval associated with one or more previously stored interval views inside the aggregated sliding window view group.

19. The one or more non-transitory computer-readable media of claim 17, further operable to cause the one or more processors to perform the operations comprising:

identifying a number of rows in one of the one or more interval view inside the aggregated sliding window view group to keep populated;

calculating the number of populated rows in the interval view;

determining whether the number of populated rows in the interval view is greater than the number of rows in the interval view to keep populated; and removing a number of rows from the interval view if the number of populated rows in the interval view is greater than the number of rows in the interval view to keep populated, wherein the number of rows to remove from the interval view is equal to the difference between the number of populated rows and the number of rows in the interval view to keep populated.

20. The one or more non-transitory computer-readable media of claim 19, wherein the number of rows removed from the interval view is removed from the interval view in an order from the oldest row in the interval view to the newest row in the interval view.

* * * * *